(12) United States Patent
Zhang et al.

(10) Patent No.: US 11,932,238 B2
(45) Date of Patent: Mar. 19, 2024

(54) AUTOMATED PARKING TECHNOLOGY

(71) Applicant: TUSIMPLE, INC., San Diego, CA (US)

(72) Inventors: Kun Zhang, San Diego, CA (US); Xiaoling Han, San Diego, CA (US); Zehua Huang, San Diego, CA (US); Charles A. Price, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 313 days.

(21) Appl. No.: 17/361,279

(22) Filed: Jun. 28, 2021

(65) Prior Publication Data
US 2021/0402988 A1 Dec. 30, 2021

Related U.S. Application Data

(60) Provisional application No. 63/045,767, filed on Jun. 29, 2020.

(51) Int. Cl.
B60W 30/06 (2006.01)
G05D 1/00 (2006.01)
(Continued)

(52) U.S. Cl.
CPC ........... B60W 30/06 (2013.01); G05D 1/0212 (2013.01); G05D 1/0259 (2013.01);
(Continued)

(58) Field of Classification Search
CPC ........... B60W 30/06; B60W 2300/145; B60W 2552/53; B60W 2555/60; B60W 2420/50;
(Continued)

(56) References Cited

U.S. PATENT DOCUMENTS 6,975,923 B2 12/2005 Spriggs
7,742,841 B2 6/2010 Sakai et al.
(Continued)

FOREIGN PATENT DOCUMENTS

CN 102590821 A 7/2012
CN 104363380 A 2/2015
(Continued)

OTHER PUBLICATIONS

European Patent Office, Extended European Search Report for EP 19859384.0, dated Apr. 4, 2022, 10 pages.
(Continued)

Primary Examiner — Daryl C Pope
(74) Attorney, Agent, or Firm — Perkins Coie LLP; Paul Liu

(57) ABSTRACT

The disclosed technology enables automated parking of an autonomous vehicle. An example method of performing automated parking for a vehicle comprises obtaining, from a plurality of global positioning system (GPS) devices located on or in an autonomous vehicle, a first set of location information that describes locations of multiple points on the autonomous vehicle, where the first set of location information are associated with a first position of the autonomous vehicle, determining, based on the first set of location information and a location of the parking area, a trajectory information that describes a trajectory for the autonomous vehicle to be driven from the first position of the autonomous vehicle to a parking area, and causing the autonomous vehicle to be driven along the trajectory to the parking area by causing operation of one or more devices located in the autonomous vehicle based on at least the trajectory information.

20 Claims, 3 Drawing Sheets

(51) Int. Cl.
*G05D 1/02* (2020.01)
*G06V 20/56* (2022.01)
*G06V 20/58* (2022.01)

(52) U.S. Cl.
CPC ......... *G05D 1/0272* (2013.01); *G06V 20/582* (2022.01); *G06V 20/584* (2022.01); *G06V 20/588* (2022.01); *B60W 2300/145* (2013.01); *B60W 2552/53* (2020.02); *B60W 2555/60* (2020.02); *G05D 2201/0213* (2013.01)

(58) Field of Classification Search
CPC .. G05D 1/0212; G05D 1/0259; G05D 1/0272; G05D 2201/0213; G06V 20/582; G06V 20/584; G06V 20/588; G06V 20/58; B62D 15/0285
See application file for complete search history.

(56) References Cited

U.S. PATENT DOCUMENTS

| | | | |
|---|---|---|---|
| 8,346,480 B2 | 1/2013 | Trepagnier et al. | |
| 8,706,394 B2 | 4/2014 | Trepagnier et al. | |
| 8,718,861 B1 | 5/2014 | Montemerlo et al. | |
| 8,983,708 B2 | 3/2015 | Choe et al. | |
| 9,088,744 B2 | 7/2015 | Grauer et al. | |
| 9,214,084 B2 | 12/2015 | Grauer et al. | |
| 9,219,873 B2 | 12/2015 | Grauer et al. | |
| 9,282,144 B2 | 3/2016 | Tebay et al. | |
| 9,317,033 B2 | 4/2016 | Ibanez-guzman et al. | |
| 9,347,779 B1 | 5/2016 | Lynch | |
| 9,418,549 B2 | 8/2016 | Kang et al. | |
| 9,494,935 B2 | 11/2016 | Okumura et al. | |
| 9,507,346 B1 | 11/2016 | Levinson et al. | |
| 9,513,634 B2 | 12/2016 | Pack et al. | |
| 9,538,113 B2 | 1/2017 | Grauer et al. | |
| 9,547,985 B2 | 1/2017 | Tuukkanen | |
| 9,549,158 B2 | 1/2017 | Grauer et al. | |
| 9,599,712 B2 | 3/2017 | Van Der Tempel et al. | |
| 9,600,889 B2 | 3/2017 | Boisson et al. | |
| 9,602,807 B2 | 3/2017 | Crane et al. | |
| 9,620,010 B2 | 4/2017 | Grauer et al. | |
| 9,625,569 B2 | 4/2017 | Lange | |
| 9,628,565 B2 | 4/2017 | Stenneth et al. | |
| 9,649,999 B1 | 5/2017 | Amireddy et al. | |
| 9,690,290 B2 | 6/2017 | Prokhorov | |
| 9,701,023 B2 | 7/2017 | Zhang et al. | |
| 9,712,754 B2 | 7/2017 | Grauer et al. | |
| 9,723,233 B2 | 8/2017 | Grauer et al. | |
| 9,726,754 B2 | 8/2017 | Massanell et al. | |
| 9,729,860 B2 | 8/2017 | Cohen et al. | |
| 9,739,609 B1 | 8/2017 | Lewis | |
| 9,753,128 B2 | 9/2017 | Schweizer et al. | |
| 9,753,141 B2 | 9/2017 | Grauer et al. | |
| 9,754,490 B2 | 9/2017 | Kentley et al. | |
| 9,760,837 B1 | 9/2017 | Nowozin et al. | |
| 9,766,625 B2 | 9/2017 | Boroditsky et al. | |
| 9,769,456 B2 | 9/2017 | You et al. | |
| 9,773,155 B2 | 9/2017 | Shotton et al. | |
| 9,779,276 B2 | 10/2017 | Todeschini et al. | |
| 9,785,149 B2 | 10/2017 | Wang et al. | |
| 9,805,294 B2 | 10/2017 | Liu et al. | |
| 9,810,785 B2 | 11/2017 | Grauer et al. | |
| 9,823,339 B2 | 11/2017 | Cohen | |
| 10,009,554 B1 | 6/2018 | Miao | |
| 2006/0202038 A1 | 9/2006 | Wang et al. | |
| 2008/0174685 A1 | 7/2008 | Shan | |
| 2010/0265346 A1 | 10/2010 | Iizuka | |
| 2011/0247031 A1 | 10/2011 | Jacoby | |
| 2012/0281133 A1 | 11/2012 | Kurita | |
| 2013/0057740 A1 | 3/2013 | Takaiwa | |
| 2016/0094797 A1 | 5/2016 | Yoon et al. | |
| 2016/0259057 A1 | 9/2016 | Ito | |
| 2016/0334230 A1 | 11/2016 | Ross et al. | |
| 2016/0344965 A1 | 11/2016 | Grauer et al. | |
| 2017/0187970 A1 | 6/2017 | Zhou et al. | |
| 2018/0091630 A1 | 3/2018 | Yeung et al. | |
| 2018/0188060 A1 | 7/2018 | Wheeler et al. | |
| 2018/0202822 A1 | 7/2018 | DeLizio et al. | |
| 2018/0203122 A1 | 7/2018 | Grauer et al. | |
| 2018/0284224 A1 | 10/2018 | Weed | |
| 2019/0037120 A1 | 1/2019 | Ohki | |
| 2019/0064800 A1 | 2/2019 | Frazzoli | |
| 2019/0179025 A1 | 6/2019 | England et al. | |
| 2019/0187716 A1* | 6/2019 | Cantrell | G05D 1/0225 |
| 2019/0204423 A1 | 7/2019 | O'Keeffe | |
| 2019/0230303 A1 | 7/2019 | Wang et al. | |
| 2019/0373188 A1 | 12/2019 | Takahashi | |
| 2020/0084361 A1 | 3/2020 | Xu et al. | |
| 2020/0174469 A1 | 6/2020 | Trumpore et al. | |

FOREIGN PATENT DOCUMENTS

| | | |
|---|---|---|
| CN | 204314826 U | 5/2015 |
| CN | 205230349 U | 5/2016 |
| CN | 106826833 A | 6/2017 |
| CN | 107229625 A | 10/2017 |
| CN | 107743590 A | 2/2018 |
| CN | 108353140 A | 7/2018 |
| JP | 2010070127 A | 4/2010 |
| KR | 100802511 B1 | 2/2008 |
| KR | 100917012 B1 | 9/2009 |
| WO | 2014166245 A1 | 10/2014 |
| WO | 2017009848 A1 | 1/2017 |
| WO | 2017089596 A1 | 6/2017 |
| WO | 2017183480 A1 | 10/2017 |
| WO | 2019114220 A1 | 6/2019 |
| WO | 2020055833 A1 | 3/2020 |
| WO | 2021073656 A1 | 4/2021 |

OTHER PUBLICATIONS

European Patent Office, Communication pursuant to Article 94(3) EPC for EP 19859384.0, dated Aug. 4, 2023, 5 pages.
U.S. Patent & Trademark Office, Final Office Action for U.S. Appl. No. 17/359,089, dated Jul. 27, 2023, 30 pages.
U.S. Patent & Trademark Office, Notice of Allowance for U.S. Appl. No. 17/986,744, dated Sep. 13, 2023, 8 pages.
Chinese Patent Office, Chinese Application No. 201980058923.3, 1st Office Action dated Mar. 16, 2023, 5 pages.
Chinese Patent Office, Chinese Application No. 201980058923.3, Search Report dated Mar. 13, 2023, 3 pages.
U.S. Appl. No. 17/359,089, Non-Final Office Action dated Feb. 15, 2023, 23 pages.
U.S. Appl. No. 17/986,766, Non-Final Office Action dated Mar. 20, 2023, 10 pages.
U.S. Appl. No. 17/325,135 Notice of Allowance dated Aug. 29, 2022, pp. 1-11.
U.S. Appl. No. 16/250,823 Non-Final Office Action dated Nov. 27, 2020, pp. 1-8.
U.S. Appl. No. 16/250,823 Final Office Action, dated May 15, 2020, pp. 1-10.
U.S. Appl. No. 16/250,823 Non-Final Office Action dated Oct. 8, 2019.
U.S. Appl. No. 16/127,022 Non-Final Office Action dated Jun. 2, 2020, pp. 1-8.
U.S. Appl. No. 16/127,022 Final Office Action dated Nov. 2, 2020, pp. 1-9.
U.S. Appl. No. 16/127,022 Notice of Allowance, dated Jan. 27, 2021, pp. 1-8.
International Application No. PCT/US2019/050364 International Search Report and Written Opinion dated Dec. 26, 2019. (9 pages).
Takuya Yoda, et al. Dynamic Photometric Stereo Method Using a Mlti-Tap CMOS Image Sensor. 23rd international Conference on Pattern Recognition (ICPR) Dec. 8, 2016. pp. 2356-2361.
Koshiro Moriguchi et al. Time-of-Flight Range Image Sensor Based on Exposure Coding with a Multi-aperture Imaging System. 2016 by ITE transaction on a Media Technology and Applications (MTA), vol. 4, No. 1, 2016. pp. 78-83.

(56) References Cited

OTHER PUBLICATIONS

Chinese Application No. 201810066893.8 Office Action dated Oct. 31, 2019.
U.S. Appl. No. 16/250,823 Notice of Allowance dated Mar. 24, 2021, pp. 1-8.

* cited by examiner

AUTOMATED PARKING TECHNOLOGY

PRIORITY CLAIMS AND RELATED PATENT APPLICATIONS

This patent document claims the priority to and the benefits of U.S. Provisional Application No. 63/045,767 entitled "AUTOMATED PARKING TECHNOLOGY" filed on Jun. 29, 2020. The entire disclosure of the aforementioned application is hereby incorporated by reference as part of the disclosure of this application.

TECHNICAL FIELD

This document relates to systems, apparatus, and methods for automated parking of an autonomous vehicle.

BACKGROUND

Autonomous vehicle navigation is a technology that can allow a vehicle to sense the position and movement of vehicles around an autonomous vehicle and, based on the sensing, control the autonomous vehicle to safely navigate towards a destination. An autonomous vehicle may control various systems within the vehicle to maintain safety while in motion, such as the steering angle, a throttle amount, the speed of the autonomous vehicle, gear changes, and breaking amount to control the extent to which the brakes are engaged. An autonomous vehicle may operate in several modes. In some cases, an autonomous vehicle may allow a driver to operate the autonomous vehicle as a conventional vehicle by controlling the steering, throttle, clutch, gear shifter, and/or other devices. In other cases, a driver may engage the autonomous vehicle navigation technology to allow the vehicle to be driven by itself. Several devices located in an autonomous vehicle can be controlled via electrical means which can be controlled by signals sent from a processor that utilizes a variety of information to determine how to proceed safely.

SUMMARY

This patent document describes systems, apparatus, and methods for automated parking of an autonomous vehicle. An example method of performing automated parking of a vehicle, comprises obtaining, from a plurality of global positioning system (GPS) devices located on or in an autonomous vehicle, a first set of location information that describes locations of multiple points on the autonomous vehicle, wherein the first set of location information are associated with a first position of the autonomous vehicle; determining, based on the first set of location information and a location of the parking area, a trajectory information that describes a trajectory for the autonomous vehicle to be driven from the first position of the autonomous vehicle to a parking area; and causing the autonomous vehicle to be driven along the trajectory to the parking area by causing operation of one or more devices located in the autonomous vehicle based on at least the trajectory information.

In some embodiments, the method further comprises obtaining an image from a camera located on the autonomous vehicle; and determining, from the image, a location of a lane associated with the parking area, wherein the causing the operation of the one or more devices is based on the trajectory information that is based on the location of the lane. In some embodiments, the method further comprises obtaining an image from a camera located on the autonomous vehicle; and determining, from the image, one or more attributes related to one or more objects detected in the image, wherein the causing the operation of the one or more devices is based on the trajectory information that is further based on the one or more attributes of the one or more objects. In some embodiments, the one or more objects includes a pedestrian, another vehicle, a traffic sign, or a speed bump.

In some embodiments, the method further comprises obtaining a second set of location information that describes locations of the multiple points on the autonomous vehicle, wherein the second set of location information are associated with a second position of the autonomous vehicle along the trajectory; and upon determining that at least one location information from the second set is within a first pre-determined distance of a pre-determined position associated with the parking area: obtaining, at a first time and from a magnetic sensor located underneath the autonomous vehicle, a first signal indicating a first distance from the magnetic sensor to a fiducial marker located on a perimeter of the parking area, wherein the causing the operation of the one or more devices is based on the trajectory information and is based on the first distance from the magnetic sensor to the fiducial marker. In some embodiments, the causing the operation of the one or more devices is based on determining and sending one or more signals to the one or more devices, wherein the one or more signals are determined based on at least the trajectory information.

In some embodiments, the method further comprises obtain an image from a camera located on the autonomous vehicle; and determine, from the image, a location of a lane that guide the autonomous vehicle to the parking area, wherein the causing the operation of the one or more devices is based on the trajectory information that is further based on the location of the lane. In some embodiments, the method further comprises obtain an image from a camera located on the autonomous vehicle; and determine, from the image, one or more locations related to one or more objects detected in the image, wherein the causing the operation of the one or more devices is based on the trajectory information that is further based on the one or more locations of the one or more objects. In some embodiments, the method further comprises obtain a second set of location information that describes locations of the multiple points on the autonomous vehicle, wherein the second set of location information are associated with a second position of the autonomous vehicle along the trajectory; and upon determining that at least one location information from the second set is within a first pre-determined distance of a pre-determined position associated with the parking area: obtain, at a first time and from a magnetic sensor located on a front bumper of the autonomous vehicle, a first signal indicating a first distance from the magnetic sensor to a fiducial marker located on a perimeter of the parking area, wherein the causing the operation of the one or more devices is based on the trajectory information and is based on the first distance from the magnetic sensor to the fiducial marker.

In some embodiments, upon determining that the at least one location information is within the first pre-determined distance of the pre-determined position associated with the parking area, the method further comprises obtain, from a wheel teeth counter sensor at a second time that is later in time than the first time, a second signal indicating a second distance travelled by the autonomous vehicle; and cause the autonomous vehicle to park the autonomous vehicle upon determining that a difference between the first distance and the second distance is within a second pre-determined distance associated with the fiducial marker. In some embodiments, the second pre-determined distance is less than the first pre-determined distance. In some embodiments, the method further comprises receive, from at least two proximity sensors, signals that indicates at least two distances from the at least two proximity sensors to an object located next to the autonomous vehicle, wherein a first proximity sensor of the at least two proximity sensors is located on a side of a front region of the autonomous vehicle, wherein a second proximity sensor of the at least two proximity sensors is located on the side of a rear region of the autonomous vehicle, and wherein the causing the operation of the one or more devices is based on the trajectory information and is based on the at least two distances.

In some embodiments, the object includes another vehicle, and the method includes determine that the autonomous vehicle has successfully parallel parked next to the another vehicle in response to the at least two distances being within a pre-determined value of each other. In some embodiments, the method further includes obtaining an image from a camera located on the autonomous vehicle; and determining that a traffic sign in the image indicates a speed limit, wherein the causing the operation of the one or more devices is based on the trajectory information and the speed limit. In some embodiments, the method further includes determining a position of the autonomous vehicle along the trajectory based on a plurality of GPS coordinates that are periodically provided by the plurality of GPS devices as the autonomous vehicle is traveling along the trajectory.

In some embodiments, the method further includes obtaining a second set of location information that describes locations of the multiple points on the autonomous vehicle, wherein the second set of location information are associated with a second position of the autonomous vehicle along the trajectory; and upon determining that at least one location information from the second set is within a first pre-determined distance of a pre-determined position associated with the parking area: obtaining, from a magnetic sensor located underneath the autonomous vehicle, a first signal indicating a first distance from the magnetic sensor to a fiducial marker located in the parking area, wherein the causing the operation of the one or more devices is based on the trajectory information and is based on the first distance from the magnetic sensor to the fiducial marker. In some embodiments, the fiducial markers include a wireless transmitter or a metal object. In some embodiments, the operation of the one or more devices is caused until the autonomous vehicle is within a range of the fiducial marker.

In yet another exemplary aspect, the above-described method is embodied in a non-transitory computer readable storage medium. The non-transitory computer readable storage medium includes code that when executed by a processor, causes the processor to perform the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Developments in autonomous driving technology have led to development of semi-trailer trucks that can be autonomously driven to deliver goods to a destination. A semi-trailer truck can be autonomously driven on highways or major roads. However, when an autonomous semi-trailer truck arrives at its destination, a driver disengages autonomous vehicle navigation technology and manually drives the semi-trailer truck to a parking spot. This patent document describes technology that can enable a vehicle to be autonomously driven to a parking spot, such as in a designated parking position or in an undesignated parking position.

As shown below, in Section I, this patent document describes the devices located on or in an autonomous vehicle that can enable automated parking application. In Section II of this patent document, techniques are described to facilitate automated parking of an autonomous vehicle. The example headings for the various sections below are used to facilitate the understanding of the disclosed subject matter and do not limit the scope of the claimed subject matter in any way. Accordingly, one or more features of one example section can be combined with one or more features of another example section.

I. Example Autonomous Vehicle Technology For Automated Parking Application

Figure 1:
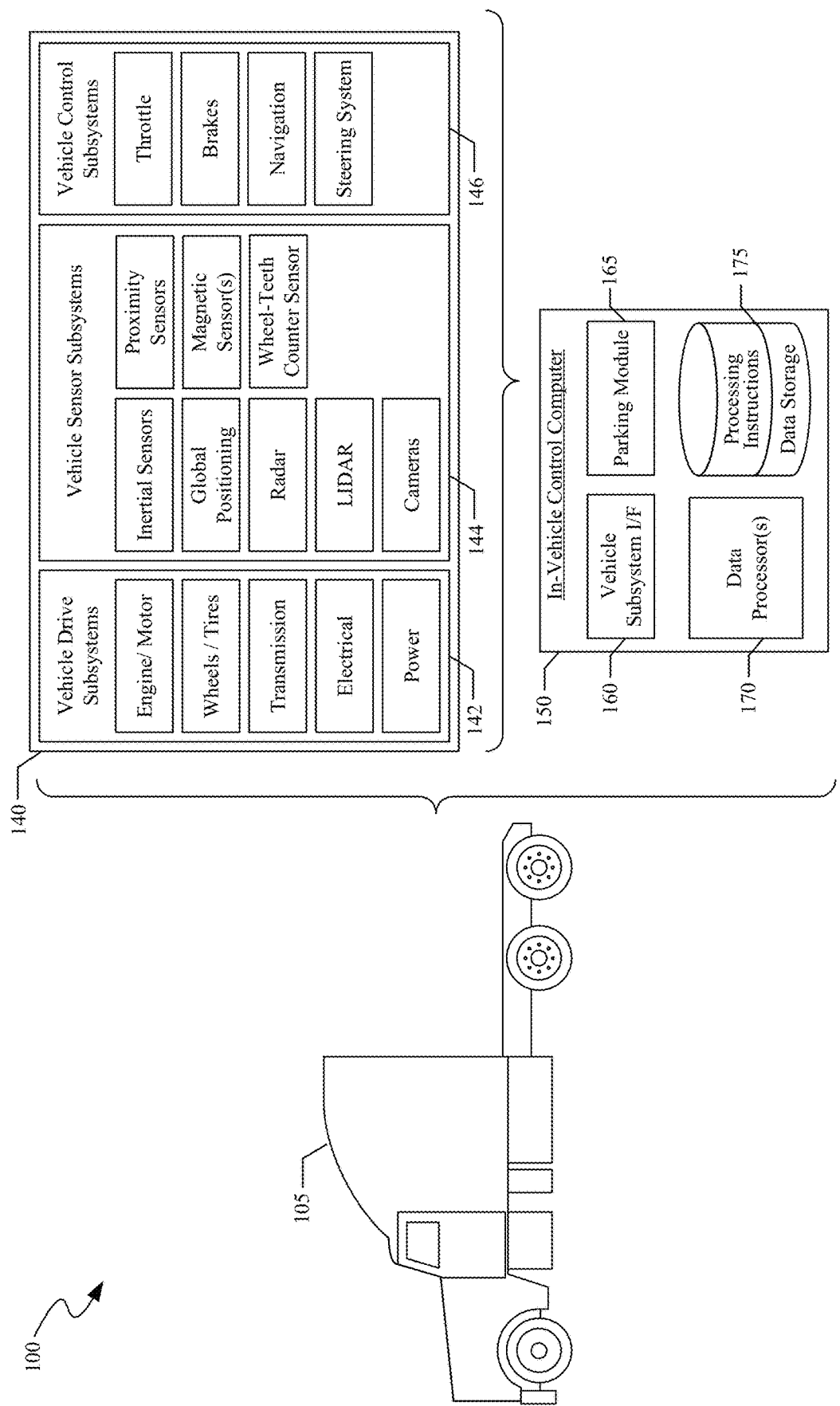
FIG. 1 shows a block diagram of an example vehicle ecosystem in which an exemplary automated parking system for an autonomous vehicle can be implemented.

FIG. 1 shows a block diagram of an example vehicle ecosystem 100 in which an exemplary automated parking system for an autonomous vehicle 105 can be implemented. The vehicle ecosystem 100 includes several systems and electrical devices that can generate, deliver, or both generate and deliver one or more sources of information, such as data packets or pieces of information, and related services to the in-vehicle control computer 150 that may be located in an autonomous vehicle 105. An autonomous vehicle 105 may be a car, a truck, a semi-trailer truck, or any land-based transporting vehicle. The in-vehicle control computer 150 can be in data communication with a plurality of vehicle subsystems 140, all of which can be resident in an autonomous vehicle 105. A vehicle subsystem interface 160 is provided to facilitate data communication between the in-vehicle control computer 150 and the plurality of vehicle subsystems 140. The vehicle subsystem interface can include a wireless transceiver, a Controller Area Network (CAN) transceiver, an Ethernet transceiver, or any combination thereof.

The autonomous vehicle 105 may include various vehicle subsystems that support the operation of autonomous vehicle 105. The vehicle subsystems may include a vehicle drive subsystem 142, a vehicle sensor subsystem 144, and a vehicle control subsystem 146 in any combination. The vehicle drive subsystem 142 may include components operable to provide powered motion for the autonomous vehicle 105. In an example embodiment, the vehicle drive subsystem 142 may include an engine or motor, wheels, tires, a transmission, an electrical subsystem, and a power source (e.g., battery and/or alternator).

The vehicle sensor subsystem 144 may include a number of sensors configured to sense information about an environment or condition of the autonomous vehicle 105. For example, the vehicle sensor subsystem 144 may include an inertial measurement unit (IMU), Global Positioning System (GPS) devices, a RADAR unit, a laser range finder/LIDAR unit, cameras or image capture devices, one or more proximity sensors, one or more magnetic sensors, and one or more wheel teeth counter sensors (or one or more gear teeth counter sensors) that can measure wheel rotation so that the wheel teeth counter sensor(s) can use such information to estimate and provide a distance travelled by the vehicle 105. The vehicle sensor subsystem 144 may also include sensors configured to monitor internal systems of the autonomous vehicle 105 (e.g., an $O_2$ monitor, a fuel gauge, an engine oil temperature).

The IMU may include any combination of sensors (e.g., accelerometers and gyroscopes) configured to sense position and orientation changes of the autonomous vehicle 105 based on inertial acceleration. The GPS devices may be any sensor configured to estimate a geographic location of the autonomous vehicle 105. For this purpose, the GPS devices may include a receiver/transmitter operable to provide information regarding the position of the autonomous vehicle 105 with respect to the earth. For a large vehicle, such as a semi-trailer truck, one GPS device can be located in a front region (e.g., on or in a tractor unit) and another GPS device can be located in a rear region (e.g., on or in a trailer unit). In another example, a first GPS device can be located in a front region of the large vehicle, a second GPS device can be located in the middle region (e.g., at a lengthwise halfway point) of the large vehicle, and a third GPS device can be located in a rear region of the large vehicle. Having multiple GPS devices on a large vehicle is beneficial technical feature at least because the parking module 165 of the in-vehicle control computer 150 can more precisely determine the location of multiple regions of the large vehicle.

The RADAR unit may represent a system that utilizes radio signals to sense objects within the local environment of the autonomous vehicle 105. In some embodiments, in addition to sensing the objects, the RADAR unit may additionally be configured to sense the speed and the heading of the objects proximate to the autonomous vehicle 105. The laser range finder or LIDAR unit may be any sensor configured to use lasers to sense objects in the environment in which the autonomous vehicle 105 is located. The cameras may include devices configured to capture a plurality of images of the environment of the autonomous vehicle 105. The cameras may be still image cameras or motion video cameras.

The vehicle sensor subsystems 144 may include proximity sensors located on at least two opposite sides of the autonomous vehicle 105. The proximity sensors can include, for example, ultrasonic sensors and can measure distance from the location of the proximity sensors to another vehicle or object located adjacent to the autonomous vehicle 105. Thus, if a proximity sensor is located on one side of the autonomous vehicle 105 (e.g., to the right side and not the front or rear), then the proximity sensor can send signals to the parking module 165 to indicate whether another vehicle or object is located to the right of the autonomous vehicle 105. In some embodiments, the proximity sensors can indicate to the parking module 165 a presence of another vehicle or object. In some embodiments, the proximity sensors can also provide to the parking module 165 a distance from the location of the proximity sensors to the location of the detected another vehicle or object.

Figure 2:
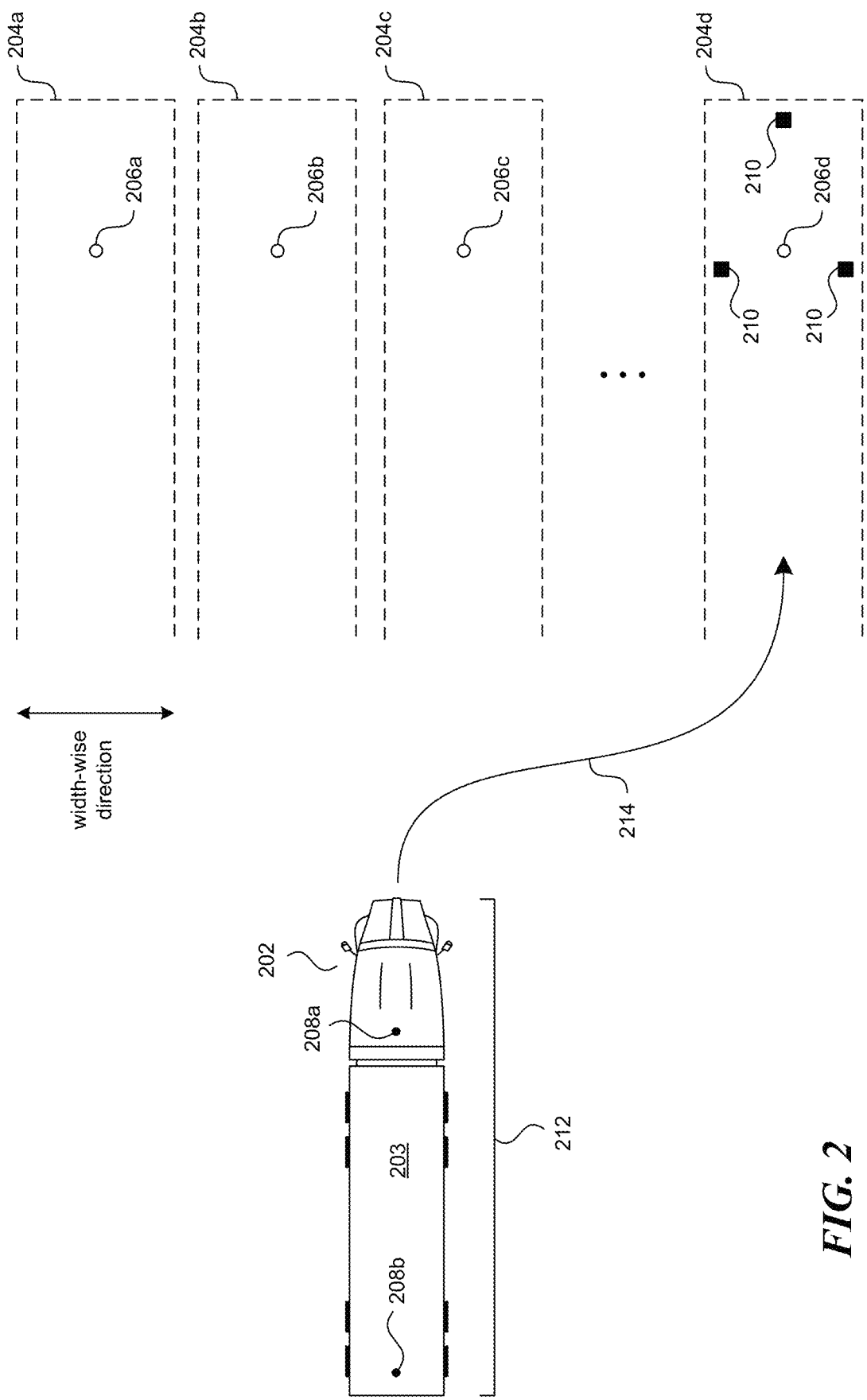
FIG. 2 shows an example parking scenario for the automated parking technology.

The vehicle sensor subsystems 144 may include one or more magnetic sensors that may be located on the chassis, front bumper and/or rear bumper of the autonomous vehicle 105. A magnetic sensor can determine a presence of a fiducial marker (e.g., a metal object or a wireless transmitter) located on the road. Thus, if a magnetic sensor is located in the middle and on the bottom of a front bumper of the autonomous vehicle 105, then the magnetic sensor can send signals to the parking module 165 to indicate whether it detects a presence of a fiducial marker located on the road, as well as possibly indicating a distance from the magnetic sensor to the fiducial marker. The fiducial marker can be placed on or in a perimeter of each parking area (as shown in FIG. 2 and as further described below) so that the autonomous vehicle 105 can be precisely driven to a proper, or predetermined, destination.

The vehicle sensor subsystems 144 may include a wheel teeth counter sensor (or gear teeth counter sensor) that can provide information that can be used to obtain a distance traveled by a wheel to the parking module 165. The wheel teeth counter sensor can detect or count teeth of a gear when the gear moves and can provide to the parking module 165 a count of the gear teeth. The parking module 165 can obtain a distance traveled by the autonomous vehicle 105 based on the count value and a pre-determined value corresponding to a distance traveled when a gear moves from a first gear tooth to a second adjacent gear tooth. In some embodiments, any device which can measure the rotation of an axel or wheel (e.g., a rotary encoder) may be used to determine a distance traveled by the autonomous vehicle 105. As further explained in this patent document, the vehicle sensor subsystems may include any one or more of the sensors shown in FIG. 1 for automated parking applications.

The vehicle control subsystem 146 may be configured to control operation of the autonomous vehicle 105 and its components. Accordingly, the vehicle control subsystem 146 may include various elements such as a throttle, an accelerator, a brake unit, a navigation unit, and a steering system.

When the autonomous vehicle includes an internal combustion engine, the throttle may be configured to control, for instance, fuel to the engine, and in turn the power generated by the engine. As such, the throttle or an accelerator may control the speed of the autonomous vehicle 105. The brake unit can include any combination of mechanisms configured to decelerate the autonomous vehicle 105. The brake unit can use friction to slow the wheels in a standard manner. The navigation unit may be any system configured to determine a driving path or route for the autonomous vehicle 105. The navigation unit may additionally be configured to update the driving path dynamically while the autonomous vehicle 105 is in operation. In some embodiments, the navigation unit may be configured to incorporate data from the GPS devices and one or more predetermined maps so as to determine the driving path for the autonomous vehicle 105.

Many or all of the functions of the autonomous vehicle 105 can be controlled by the in-vehicle control computer 150. The in-vehicle control computer 150 may include at least one data processor 170 (which can include at least one microprocessor) that executes processing instructions stored in a non-transitory computer readable medium, such as the data storage device 175 or memory. The in-vehicle control computer 150 may also represent a plurality of computing devices that may serve to control individual components or subsystems of the autonomous vehicle 105 in a distributed fashion. In some embodiments, the data storage device 175 may contain processing instructions (e.g., program logic) executable by the data processor 170 to perform various methods and/or functions of the autonomous vehicle 105, including those described in this patent document. For instance, the data processor 170 executes the operations associated with parking module 165 for managing sensor data and determining how to park the autonomous vehicle 105 as described in this patent document. The data storage device 175 may contain additional instructions as well, including instructions to transmit data to, receive data from, interact with, or control one or more of the vehicle drive subsystem 142, the vehicle sensor subsystem 144, and the vehicle control subsystem 146. In some embodiment, additional components or devices can be added to the various subsystems or one or more components or devices (e.g., LiDAR or Radar shown in FIG. 1) can be removed without affecting the techniques described in this patent document for the automated parking technology. The in-vehicle control computer 150 can be configured to include a data processor 170 and a data storage device 175.

The in-vehicle control computer 150 may control the function of the autonomous vehicle 105 based on inputs received from various vehicle subsystems (e.g., the vehicle drive subsystem 142, the vehicle sensor subsystem 144, and the vehicle control subsystem 146). For example, the in-vehicle control computer 150 may use input from the vehicle control subsystem 146 in order to control the steering system to avoid an obstacle detected by the vehicle sensor subsystem 144, move in a controlled manner, or follow a path or trajectory to a parking location. In an example embodiment, the in-vehicle control computer 150 can be operable to provide control over many aspects of the autonomous vehicle 105 and its subsystems. The parking module can constantly or periodically receive information such as wheel speed, current engine torque, steering angle, brake pressure, and get camera, GPS, ultrasonic sensors reading. Based on the received information, the parking module can calculate desired commands to control driving related operations of the autonomous vehicle 105.

II. Example Techniques For Automated Parking

The techniques described in this patent document can enable an autonomous vehicle to park in a designated parking location (e.g., marked parking spots) or in an undersigned parking location.

FIG. 2 shows an example parking scenario for the automated parking technology. FIG. 2 shows a bird's-eye view of an autonomous vehicle 202 located in a parking location at a starting position 212. The parking location includes having multiple parking areas 204a-204d, where the parking areas 204a-204d are respectively associated with GPS coordinates that describe pre-determined positions 206a-206d of the parking areas 204a-204d. As further described below, each parking area can be associated with a pre-determined position that can be used by the parking module of the in-vehicle control computer to determine trajectory information that indicates a trajectory 214 that the autonomous vehicle 202 can follow to be guided to parking area 204d. Trajectory information may include, for example, GPS coordinates of multiple points on the trajectory where the autonomous vehicle 202 is expected to travel or position information of multiple points on the trajectory relative to the location of the autonomous vehicle 202. For ease of description and illustration, the parking areas 204a-204d are shown to include parking related road markers. In some embodiments, the parking areas 204a-204d may include parking road markers that indicate the area within which the autonomous vehicle 202 is expected to be parked. In some embodiments, the parking areas may be unmarked.

The autonomous vehicle 202 includes multiple GPS devices 208a, 208b. In FIG. 2, one GPS device 208a is located on or in the tractor unit 203 of the semi-trailer truck 202 and another GPS device 208b is located on or in the rear of the trailer unit 205 of the semi-trailer truck 202. GPS devices 208a, 208b can provide coordinates related to the autonomous vehicle's 202 position to the parking module (165 in FIG. 1). The parking module can use GPS coordinates provided by the GPS devices 208a, 208b and the location of the parking area 204d (e.g., a pre-determined GPS coordinates of the pre-determined position 206d) to obtain trajectory information that describes a trajectory 214 for the autonomous vehicle 202 to be driven from the starting position 212 of the autonomous vehicle to a designated parking area (e.g., 204d). The trajectory information can be determined using GPS coordinates of the starting position 212 (e.g., GPS coordinates of GPS device 208a) of the autonomous vehicle 202 and the location of a parking area 204d (e.g., the pre-determined position 206d of the parking area 204d). The parking module can also use the GPS coordinates that may be periodically provided by the GPS devices 208a, 208b to measure the position of the autonomous vehicle 202 as it is being driven along the trajectory 214 to the parking area 204d.

A technical benefit of having multiple GPS devices 208a, 208b located at different regions of the autonomous vehicle 202 is that it can enable the parking module to determine an orientation of the autonomous vehicle 202 relative to a pre-determined orientation of parking area 204d. For example, the multiple GPS devices 208a, 208b can be located width-wise in the middle of the front region and in the middle of the rear region of the autonomous vehicle 202 and the pre-determined orientation can includes GPS coordinates of two-predetermined positions located width-wise in the middle of the parking area. The width-wise direction is shown on the top right corner of FIG. 2. In this example, the parking module can use the four sets of GPS coordinates (i.e., from the GPS devices 208a, 208b, and two pre-determined positions) to determine the orientation of the autonomous vehicle 202 relative to the orientation of the parking area and to determine the trajectory information.

The parking module can cause the autonomous vehicle 202 to be driven along the trajectory 214 described by the trajectory information to the parking area 204d. For example, the parking module can, based on at least the trajectory information, send one or more signals to one or more devices (steering system motor(s), brake, throttle, etc.) in the autonomous vehicle 202 to drive the autonomous vehicle 202 to a parking area 204d. The parking module can determine the one or more signals based on trajectory information. For example, if the autonomous vehicle 202 is located at the current position 212, then the parking module can determine that to follow along the trajectory 214, the autonomous vehicle's steering device/motors need to be turned to the right by certain degrees and then to the left by certain degrees to reach the parking area 204d. The parking module can also determine an amount of throttle and/or amount of brakes to be applied based on at least the trajectory information.

II.(a). Fiducial Based Parking

GPS devices 208a, 208b can periodically provide position related coordinates to the parking module. However, GPS technology is not as accurate as would be needed for precise parking related operations of an autonomous vehicle such as a semi-trailer truck. Thus, the automated parking technology can use a multi-zoned approach. For example, a coarse adjustment driving zone can be located within a distance of 10 feet to 100 feet of the pre-determined position 206d of a parking area 204d, and a fine adjustment driving zone can be located within a distance of 10 feet of one or more fiducial markers 210 that may be located on or in a perimeter of each parking area (e.g., as shown as 210 for parking area 204d).

In FIG. 2, one or more fiducial markers 210 are shown only in parking area 204d for ease of illustration. Each parking area 204a-204d may include one or more fiducial markers 210 on at least some portion (e.g., three sides) of the perimeter of each parking area. In embodiments where the fiducial marker(s) 210 are located on three sides of a parking area, such a feature can provide a technical benefit of enabling the one or more sensors in the autonomous vehicle to sense the fiducial marker(s) 210 to guide the autonomous vehicle into the parking area (e.g., by determining amount of steering and/or throttle to park the autonomous vehicle within a pre-defined region such as within a certain distance of the fiducial marker(s) 210).

Using the example values described above and using GPS coordinates of the autonomous vehicle 202, if the parking module determines that the autonomous vehicle 202 is located within 10 feet of the pre-determined position 206d, then the parking module can use the measurements obtained from one or more sensors located on or in the autonomous vehicle 202 to detect the fiducial marker(s) 210 to finely control the movements of the autonomous vehicle 202. In some embodiments, the parking module can use the GPS coordinates within the fine adjustment driving zone to control movements of the autonomous vehicle 202 but may rely more so on the information obtained from the one or more sensors that can provide better position resolution or accuracy compared to GPS technology within the fine adjustment driving zone. The automated parking techniques and features based on GPS and fiducial marker(s) are further described below.

In the automated parking technology, the information provided by GPS technology can be used by the parking module (165 in FIG. 1) to send instructions to one or more devices (e.g., steering system motor(s), brake, throttle, etc.,) in the autonomous vehicle 202 to coarsely drive the autonomous vehicle 202 to a parking area 204d, and the information provided by one or more sensors (e.g., magnetic sensor(s) and/or proximity sensor(s)) located on the autonomous vehicle 202 can be used by the parking module 165 to finely adjust the driving behavior of the one or more devices or subsystems.

Detection of the fiducial marker(s) 210 can be done by the one or more sensors (e.g., magnetic sensors or LiDARs or Radars or wireless receiver) located on the autonomous vehicle 202. For example, if a fiducial marker 210 includes a metal object, magnetic sensors located underneath the autonomous vehicle 202 may detect the presence and distance from the magnetic sensors to such metal objects. The parking module can obtain information from a magnetic sensor located underneath the autonomous vehicle upon determining that the autonomous vehicle 202 is within the fine adjustment driving zone. For example, the parking module can obtain from the GPS devices 208a, 208b a second set of multiple GPS coordinates associated with a second location along the trajectory 214 after the autonomous vehicle 202 has left the current position 212 and is in transit to the parking area 204d. The parking module can enable (e.g., turn on) and/or receive or process signals from the magnetic sensors upon determining that at least one GPS coordinates (e.g., for GPS device 208a) is within a first pre-determined distance of a pre-determined position 206d of the parking area 204d.

The processing of signals from the one or more sensors within a first pre-determined distance or within a fine adjustment driving zone can beneficially preserve computational resources. This preservation of computational resources is at least because the one or more sensors may not be able to detect the fiducial marker if the autonomous vehicle 202 is located outside of the fine adjustment driving zone (or outside the detection range of the one or more sensors). In scenarios where the fiducial marker(s) 210 are located outside of the detection range of the one or more sensors, the parking module can preserve computational resources by not unnecessarily monitoring the signals from the one or more sensors.

The parking module (165 in FIG. 1) can obtain from a magnetic sensor at a first time a first signal indicating a first distance from the magnetic sensor to a fiducial marker 210. The parking module 165 can determine and send the one or more signals to the one or more devices (e.g., components or sub-systems such as vehicle drive subsystems 142, vehicle control subsystems 146) in the autonomous vehicle 202 to drive the autonomous vehicle 202, where the signal(s) are determined based on the trajectory information and the first distance. In some embodiments, the parking module 165 can perform fine adjustment to the driving operation of the autonomous vehicle 202 until the parking module determines from the one or more sensors that the autonomous vehicle 202 is within an acceptable range of the fiducial marker(s) 210. For example, the parking module can obtain from the magnetic sensor at a second time (after the first time mentioned above) a second signal indicating a second distance from the magnetic sensor to the fiducial marker 210. The parking module can determine that the second distance is less than or equal to a second pre-determined distance associated with the fiducial marker and can send signal(s) to the device(s) to apply brakes and/or park the autonomous vehicle 202. In some embodiments, the second pre-determined distance is less than the first pre-determined distance at least because the first pre-determined distance may describe a transition point between a coarse adjustment driving zone and a fine adjustment driving zone, and the second pre-determined distance is associated with determining when an autonomous vehicle has successfully reached an acceptable position within the parking area.

Fiducial markers may include other types of physical or virtual markers. In an example, if the fiducial marker 210 includes a wireless transmitter, a wireless receiver can receive the transmitted signal and can determine distance to the wireless transmitter based on signal strength determined by the wireless receiver or determined by parking module based on received signal metrics provided by the wireless receiver. In another example, if the fiducial marker 210 includes a raised object, the LiDAR or Radar can detect such raised objects and the parking module can determine distance from the data provided by LiDAR or Radar to the raised objects.

In some embodiments, multiple sensors can be deployed on the autonomous vehicle 202. For example, a first set of one or more magnetic sensor can be located in or on the bottom of the front bumper in the tractor unit and a second set of one or more magnetic sensors can be located in or on the bottom of the rear bumper in the trailer unit. In some embodiments, the fiducial marker(s) 210 can be physical markers (e.g., metal object, markings, raised objects, etc.,) or virtual (e.g., wireless transmitter, etc.,).

II.(b). Lane and Object Detection

The automated parking technology can use images obtained by cameras located on the autonomous vehicle 202 for parking related operations. Autonomous vehicle 202 can be driven autonomously by performing image processing on the images obtained by the cameras. In some embodiments, a parking module (165 in FIG. 1) can perform image processing on an image obtained from a camera located on the autonomous vehicle 202 to determine a presence and/or one or more locations of one or more lanes associated with a parking area. The one or more lanes can be considered fiducial marker(s) and can include physical lane markers located on or painted on the road. The parking module can determine from an image a presence of a lane and the location of one or more points along the lane. The parking module 165 can use the location information associated with the one or more lanes to further determine the trajectory information (e.g., refine the GPS based trajectory information) so that, based on the determined or refined trajectory information, the parking module can send signals that instruct one or more devices (e.g., steering system motor(s), brake, throttle, etc.,) in the autonomous vehicle 202 to drive the autonomous vehicle 202 to a parking area 204d.

In some embodiments, a parking module can perform image processing on an image obtained from a camera located on the autonomous vehicle to determine one or more attributes (e.g., presence and/or location(s) and/or character recognition of traffic signs) related to one or more objects detected in the image. The one or more objects may include, for example, a pedestrian, another vehicle, a traffic sign, or a speed bump. The parking module can use the one or more attributes associated with the one or more objects to further determine the trajectory information (e.g., refine the GPS based trajectory information) so that, based on the determined or refined trajectory information, the parking module can send signals that instruct one or more devices (e.g., steering system motor(s), brake, throttle, etc.,) in the autonomous vehicle 202 to drive the autonomous vehicle 202 to a parking area 204d by performing, for example, object avoidance or object compliance. An example of object avoidance can include sending a signal to engage brakes upon detecting a pedestrian. An example of object compliance can include the parking module determining the speed limit attribute by performing image processing on the traffic sign and can send signals to drive the autonomous vehicle 202 at a speed less than the posted speed limit.

II.(c). Proximity Sensor For Parking

The autonomous vehicle 202 may include proximity sensors that may be located on at least two opposite sides of the autonomous vehicle 202. A benefit of including proximity sensors for automated parking is that it can facilitate or assist in sequential or parallel parking of the autonomous vehicle 202 relative to other vehicles that may be parked next to the parking area 204b where the autonomous vehicle 202 is instructed to park.

The parking module can determine that the autonomous vehicle 202 has successfully parallel parked relative to another vehicle upon determining that two proximity sensors located on one side of the autonomous vehicle 202 provide a same two distance measurement values relative to another vehicle located next to the autonomous vehicle 202. The parking module can determine that the two proximity sensors provide a same two distance measurement values upon determining that the two distance measurement values are within a pre-determined acceptable tolerance of each other. For example, if a first distance measurement from a first proximity sensor located on a side of tractor unit (or front region of the autonomous vehicle 202) is 24.0 inches and if a second distance measurement from a second proximity sensor located on the side of trailer unit (or rear region of the autonomous vehicle 202) is 24.2 inches, then the parking module can determine that the two distance measurement values are the same (e.g., within a pre-determined acceptable tolerance of 0.3 inches of each other).

In some embodiments, the parking module can send signals that instruct one or more device in the autonomous vehicle 202 to adjust the autonomous vehicle 202 in response to receiving multiple distance measurement values from the multiple proximity sensors. When the parking module determines that the first distance measurement from the first proximity sensor is outside the pre-determined acceptable tolerance relative to the second distance measurement from the second proximity sensor, then the parking module can adjust the driving operation to properly parallel park the autonomous vehicle 202. For example, if the parking module obtains the first distance measurement of 24.0 inches and the second distance measurement of 30 inches, then the parking module can determine that the autonomous vehicle 202 is not parallel to the object next to the autonomous vehicle 202 and the parking module can send instructions to enable the steering motor to turn to minimize the difference between the two distance measurement values.

II.(d). Feedback System

The parking module can receive information from the GPS device 208a, 208b and/or one or more sensors to determine and send signals to adjust the autonomous vehicle 202. For example, if the parking module determines, using signals provided by the one or more sensors, that the autonomous vehicle 202 is within a pre-determined area including the parking position where it should be parked (e.g., within a certain distance of a fiducial marker), the parking module can send signals to engage the autonomous vehicle's brakes and park the autonomous vehicle. In some embodiments, if the parking module determines that the autonomous vehicle 202 is within a pre-determined area including the parking position of where it should be parked but that the proximity sensors indicate that the vehicle is not parallel parked relative to a neighboring vehicle, then the parking module can send signals to one or more devices to back up the autonomous vehicle 202, turn the steering motors, and re-position the autonomous vehicle 202 to be properly parallel parked. The steering motor angles can be determined based at least on the distance measurement values provided by the proximity sensors.

In some embodiments, measurements provided by a wheel teeth counter sensor can be used by the parking module to determine a precise distance traveled by the autonomous vehicle. The wheel teeth counter sensor can provide information used by the parking module to calculate distance traveled by the autonomous vehicle 202 which can be combined with the GPS information and/or information provided by the one or more sensors to instruct one or more devices in the autonomous vehicle for precise parking. For example, in the fine adjustment driving zone, when the one or more sensors provide information regarding the fiducial marker(s) 210 that can be used by the parking module to determine distance from the one or more sensors to the fiducial marker(s) 210, the parking module can use the wheel teeth counter to precisely measure how much distance the truck has travelled so that the parking module can instruct the autonomous vehicle 202 to engage brakes or to maintain throttle amount. Specifically, in an example, if the parking module determines that a first distance from the one or more sensors to the fiducial marker(s) is 10 feet, the parking module can instruct the throttle to move the autonomous vehicle 202 a distance of 9.5 feet which can be measured in real-time by the wheel teeth sensor or another physical measuring device attached to a wheel or axel of the autonomous vehicle. In this example, the parking module can engage brakes and/or park the autonomous vehicle upon determining that a difference between the first distance (i.e., 10 feet) and a second distance measured by the wheel teeth counter sensor (e.g., 9.5 of travelled distance) is within a pre-determined value (e.g., 1.0 foot). The pre-determined value can describe an acceptable range within a location of a fiducial marker within which the autonomous vehicle 202 can be parked.

Figure 3:
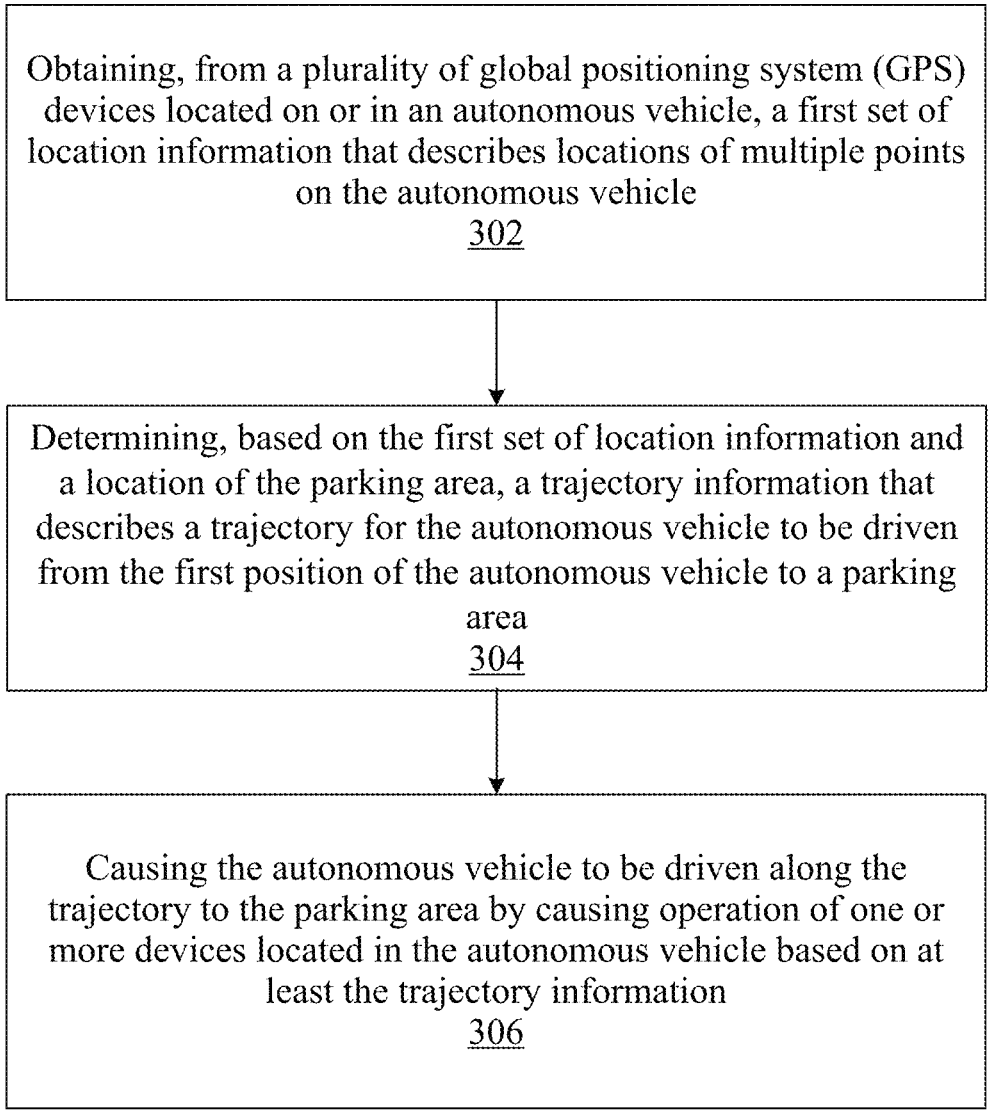
FIG. 3 shows an exemplary flow diagram to perform automated parking operations for a vehicle.

FIG. 3 shows an exemplary flow diagram to perform automated parking operations for a vehicle. At operation 302, the parking module obtains, from a plurality of global positioning system (GPS) devices located on or in an autonomous vehicle, a first set of location information that describes locations of multiple points on the autonomous vehicle. The first set of location information are associated with a first position of the autonomous vehicle. At operation 304, the parking module determines, based on the first set of location information and a location of the parking area, a trajectory information that describes a trajectory for the autonomous vehicle to be driven from the first position of the autonomous vehicle to a parking area.

At operation 306, the parking module causing the autonomous vehicle to be driven along the trajectory to the parking area by causing operation of one or more devices located in the autonomous vehicle based on at least the trajectory information. In some embodiments, the causing the operation of the one or more devices is based on determining and sending one or more signals to the one or more devices, where the one or more signals are determined based on at least the trajectory information.

In some embodiments, the method shown in FIG. 3 further includes obtaining an image from a camera located on the autonomous vehicle; and determining, from the image, one or more locations of one or more lanes associated with the parking area, where the causing the operation of the one or more devices is based on the trajectory information that is further based on the one or more locations of the one or more lanes. In some embodiments, the method shown in FIG. 3 further includes obtaining an image from a camera located on the autonomous vehicle, and determining, from the image, one or more attributes related to one or more objects detected in the image, where the causing the operation of the one or more devices is based on the trajectory information that is further based on the one or more attributes of the one or more objects. In some embodiments, the one or more objects may include a pedestrian, another vehicle, a traffic sign, or a speed bump.

In some embodiments, the method shown in FIG. 3 further includes obtaining a second set of location information that describes locations of the multiple points on the autonomous vehicle, where the second set of location information are associated with a second position of the autonomous vehicle along the trajectory, and upon determining that at least one location information from the second set is within a first pre-determined distance of a pre-determined position associated with the parking area: obtaining, at a first time and from a magnetic sensor located underneath the autonomous vehicle, a first signal indicating a first distance from the magnetic sensor to a fiducial marker located on a perimeter of the parking area, where the causing the operation of the one or more devices is based on the trajectory information and is based on the first distance from the magnetic sensor to the fiducial marker.

In some embodiments, upon determining that the at least one location information is within the first pre-determined distance of the pre-determined position associated with the parking area, the method shown in FIG. 3 further comprises: obtaining, from the magnetic sensor at a second time that is later in time than the first time, a second signal indicating a second distance from the magnetic sensor to the fiducial marker; and causing the autonomous vehicle to apply brakes and park the autonomous vehicle upon determining that the second distance is within a second pre-determined distance associated with the fiducial marker. In some embodiments, upon determining that the at least one location information is within the first pre-determined distance of the pre-determined position associated with the parking area, the method shown in FIG. 3 further comprises: obtaining, from a wheel teeth counter sensor at a second time that is later in time than the first time, a second signal indicating a second distance travelled by the autonomous vehicle; and causing the autonomous vehicle to park the autonomous vehicle upon determining that a difference between the first distance and the second distance is within a second pre-determined distance associated with the fiducial marker. Alternatively, or additionally, a rotary encoder may be used to send a signal that is indicative of the number of revolutions of at least one wheel and a second distance traveled by the autonomous vehicle can be calculated from this signal.

In some embodiments, the method shown in FIG. 3 further includes receiving, from at least two proximity sensors, signals that indicates at least two distances from the at least two proximity sensors to an object located next to the autonomous vehicle, where a first proximity sensor of the at least two proximity sensors is located on a side of a front region of the autonomous vehicle, and where a second proximity sensor of the at least two proximity sensors is located on the side of a rear region of the autonomous vehicle, and where the causing the operation of the one or more devices is based on the trajectory information and is based on the at least two distances. In some embodiments, wherein the object includes a vehicle, and the in-vehicle control computer in the autonomous vehicle is configured to determine that the autonomous vehicle has successfully parallel parked next to the vehicle in response to the at least two distances being within a pre-determined value of each other.

In this disclosure, LiDAR and LIDAR are used to refer to light detection and ranging devices and methods, and alternatively, or additionally, laser detection and ranging devices and methods. The use of these acronyms does not imply limitation of the described devices, systems, or methods to the use of one over the other.

In this document the term "exemplary" is used to mean "an example of" and, unless otherwise stated, does not imply an ideal or a preferred embodiment. In this document, the term "microcontroller" can include a processor and its associated memory.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of performing automated parking of a vehicle, comprising:
obtaining, from a plurality of global positioning system (GPS) devices located on or in an autonomous vehicle, a first set of location information that describes locations of multiple points on the autonomous vehicle, wherein the first set of location information are associated with a first position of the autonomous vehicle;
determining, based on the first set of location information and a location of a parking area, a trajectory information that describes a trajectory for the autonomous vehicle to be driven from the first position of the autonomous vehicle to a parking area;
causing the autonomous vehicle to be driven along the trajectory to the parking area by causing operation of one or more devices located in the autonomous vehicle based on at least the trajectory information;
obtaining an image from a camera located on the autonomous vehicle; and
determining, from the image, one or more attributes related to one or more objects detected in the image, wherein the causing the operation of the one or more devices is based on the trajectory information that is further based on the one or more attributes of the one or more objects.

2. The method of claim 1,
wherein another location of a lane associated with the parking area is determined from the image, and
wherein the causing the operation of the one or more devices is based on the trajectory information that is based on the location of the lane.

3. The method of claim 1, wherein the one or more objects includes a pedestrian, another vehicle, a traffic sign, or a speed bump.

4. The method of claim 1, further comprising:
obtaining a second set of location information that describes locations of the multiple points on the autonomous vehicle, wherein the second set of location information are associated with a second position of the autonomous vehicle along the trajectory; and
upon determining that at least one location information from the second set is within a first pre-determined distance of a pre-determined position associated with the parking area:
obtaining, at a first time and from a magnetic sensor located underneath the autonomous vehicle, a first signal indicating a first distance from the magnetic sensor to a fiducial marker located on a perimeter of the parking area,
wherein the causing the operation of the one or more devices is based on the trajectory information and is based on the first distance from the magnetic sensor to the fiducial marker.

5. The method of claim 1, wherein the causing the operation of the one or more devices is based on determining and sending one or more signals to the one or more devices, wherein the one or more signals are determined based on at least the trajectory information.

6. An apparatus for performing automated parking of a vehicle, the apparatus comprising a processor configured to implement a method comprising:
obtain, from a plurality of global positioning system (GPS) devices located on or in an autonomous vehicle, a first set of location information that describes locations of multiple points on the autonomous vehicle, wherein the first set of location information are associated with a first position of the autonomous vehicle;
determine, based on the first set of location information and a location of a parking area, a trajectory information that describes a trajectory for the autonomous vehicle to be driven from the first position of the autonomous vehicle to a parking area;
cause the autonomous vehicle to be driven along the trajectory to the parking area by causing operation of one or more devices located in the autonomous vehicle based on at least the trajectory information;
obtain an image from a camera located on the autonomous vehicle; and determine, from the image, one or more attributes related to one or more objects detected in the image, wherein the causing the operation of the one or more devices is based on the trajectory information that is further based on the one or more attributes of the one or more objects.

7. The apparatus of claim 6,
wherein another location of a lane that guide the autonomous vehicle to the parking area is determined from the image, and
wherein the causing the operation of the one or more devices is based on the trajectory information that is further based on the location of the lane.

8. The apparatus of claim 6,
wherein one or more locations related to the one or more objects are detected in the image, and
wherein the causing the operation of the one or more devices is based on the trajectory information that is further based on the one or more locations of the one or more objects.

9. The apparatus of claim 6, wherein the processor is configured to implement the method that further comprises:
obtain a second set of location information that describes locations of the multiple points on the autonomous vehicle, wherein the second set of location information are associated with a second position of the autonomous vehicle along the trajectory; and
upon determining that at least one location information from the second set is within a first pre-determined distance of a pre-determined position associated with the parking area:
obtain, at a first time and from a magnetic sensor located on a front bumper of the autonomous vehicle, a first signal indicating a first distance from the magnetic sensor to a fiducial marker located on a perimeter of the parking area,
wherein the causing the operation of the one or more devices is based on the trajectory information and is based on the first distance from the magnetic sensor to the fiducial marker.

10. The apparatus of claim 9, wherein upon determining that the at least one location information is within the first pre-determined distance of the pre-determined position associated with the parking area, the processor is configured to implement the method that further comprises:
obtain, from a wheel teeth counter sensor at a second time that is later in time than the first time, a second signal indicating a second distance travelled by the autonomous vehicle; and
cause the autonomous vehicle to park the autonomous vehicle upon determining that a difference between the first distance and the second distance is within a second pre-determined distance associated with the fiducial marker.

11. The apparatus of claim 10, wherein the second pre-determined distance is less than the first pre-determined distance.

12. The apparatus of claim 6, wherein the processor is configured to implement the method that further comprises:
receive, from at least two proximity sensors, signals that indicates at least two distances from the at least two proximity sensors to an object located next to the autonomous vehicle,
wherein a first proximity sensor of the at least two proximity sensors is located on a side of a front region of the autonomous vehicle,
wherein a second proximity sensor of the at least two proximity sensors is located on the side of a rear region of the autonomous vehicle, and
wherein the causing the operation of the one or more devices is based on the trajectory information and is based on the at least two distances.

13. The apparatus of claim 12,
wherein the object includes another vehicle, and
wherein the processor is configured to determine that the autonomous vehicle has successfully parallel parked next to the another vehicle in response to the at least two distances being within a pre-determined value of each other.

14. A non-transitory computer readable storage medium having code stored thereon, the code, when executed by a processor, causing the processor to implement a method of performing automated parking of a vehicle comprising:
obtaining, from a plurality of global positioning system (GPS) devices located on or in an autonomous vehicle, a first set of location information that describes locations of multiple points on the autonomous vehicle, wherein the first set of location information are associated with a first position of the autonomous vehicle;
determining, based on the first set of location information and a location of a parking area, a trajectory information that describes a trajectory for the autonomous vehicle to be driven from the first position of the autonomous vehicle to a parking area;
causing the autonomous vehicle to be driven along the trajectory to the parking area by causing operation of one or more devices located in the autonomous vehicle based on at least the trajectory information;
obtaining an image from a camera located on the autonomous vehicle; and
determining, from the image, one or more attributes related to one or more objects detected in the image, wherein the causing the operation of the one or more devices is based on the trajectory information that is further based on the one or more attributes of the one or more objects.

15. The non-transitory computer readable storage medium of claim 14,
wherein a traffic sign in the image is determined to indicate a speed limit, and
wherein the causing the operation of the one or more devices is based on the trajectory information and the speed limit.

16. The non-transitory computer readable storage medium of claim 14, further comprising:
determining a position of the autonomous vehicle along the trajectory based on a plurality of GPS coordinates that are periodically provided by the plurality of GPS devices as the autonomous vehicle is traveling along the trajectory.

17. The non-transitory computer readable storage medium of claim 14, wherein the method further comprises:
obtaining a second set of location information that describes locations of the multiple points on the autonomous vehicle, wherein the second set of location information are associated with a second position of the autonomous vehicle along the trajectory; and
upon determining that at least one location information from the second set is within a first pre-determined distance of a pre-determined position associated with the parking area:
obtaining, from a magnetic sensor located underneath the autonomous vehicle, a first signal indicating a first distance from the magnetic sensor to a fiducial marker located in the parking area, wherein the causing the operation of the one or more devices is based on the trajectory information and is based on the first distance from the magnetic sensor to the fiducial marker.

18. The non-transitory computer readable storage medium of claim 17, wherein the fiducial marker includes a wireless transmitter or a metal object.

19. The non-transitory computer readable storage medium of claim 17, wherein the processor is configured to cause the operation of the one or more devices until the autonomous vehicle is within a range of the fiducial marker.

20. The method of claim 1, wherein a traffic sign in the image is determined to indicate a speed limit, and wherein the causing the operation of the one or more devices is based on the trajectory information and the speed limit.

* * * * *